United States Patent
Lo et al.

(10) Patent No.: US 8,659,725 B2
(45) Date of Patent: Feb. 25, 2014

(54) PIXEL STRUCTURE, LIQUID CRYSTAL DISPLAY PANEL AND TRANSPARENT LIQUID CRYSTAL DISPLAY DEVICE

(75) Inventors: Wen-Bin Lo, Hsin-Chu (TW); Ching-Huan Lin, Hsin-Chu (TW); Chu-Yu Liu, Hsin-Chu (TW); Norio Sugiura, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 159 days.

(21) Appl. No.: 13/415,861

(22) Filed: Mar. 9, 2012

(65) Prior Publication Data
US 2013/0050618 A1 Feb. 28, 2013

(30) Foreign Application Priority Data
Aug. 29, 2011 (TW) .............. 100130925 A (51) Int. Cl.
*G02F 1/1335* (2006.01)
*G02F 1/1337* (2006.01)

(52) U.S. Cl.
USPC ............. 349/108; 349/109; 349/96; 349/130; 345/88

(58) Field of Classification Search
USPC ........................ 349/108, 109, 96, 130; 345/88
See application file for complete search history.

(56) References Cited

U.S. PATENT DOCUMENTS

| | | | |
|---|---|---|---|
| 7,580,097 B2 * | 8/2009 | Moon et al. | 349/113 |
| 2006/0267892 A1 * | 11/2006 | Pei et al. | 345/88 |
| 2010/0309296 A1 | 12/2010 | Harrold | |
| 2013/0176511 A1 * | 7/2013 | Hoshino et al. | 349/15 |

* cited by examiner

*Primary Examiner* — Mike Qi
(74) *Attorney, Agent, or Firm* — Winston Hsu; Scott Margo (57) ABSTRACT

A pixel structure, which may be used in a liquid crystal display panel, includes a plurality of display pixel units and a plurality of control devices. Each of the display pixel units includes a first sub-pixel adapted to provide a first color, a second sub-pixel adapted to provide a second color, a third sub-pixel adapted to provide a third color, a first white sub-pixel, a second white sub-pixel, and a third white sub-pixel. Each of the control devices is employed for respectively controlling each of the sub-pixels. The liquid crystal display panel is normally white when the first sub-pixel, the second sub-pixel, the third sub-pixel, the first white sub-pixel, the second white sub-pixel, and the third white sub-pixel are not driven by the control devices.

17 Claims, 10 Drawing Sheets

PIXEL STRUCTURE, LIQUID CRYSTAL DISPLAY PANEL AND TRANSPARENT LIQUID CRYSTAL DISPLAY DEVICE

BACKGROUND OF THE INVENTION

1. Field of the Invention

The present invention relates to a display device and a pixel structure, and more particularly, to a pixel structure, a liquid crystal display panel and a transparent liquid crystal display panel used in a transparent display device.

2. Description of the Prior Art

A transparent display device generally refers to a display device capable of presenting a transparent state for permitting images behind the display device to pass through. The transparent display device may be used in a showcase to display both a display image and materials behind the transparent display device. Many kinds of technologies are integrated with the transparent display device. The technology related to the transparent display device employing liquid crystal display panel has been published in the market because the technology of the liquid crystal display panel is relatively mature.

The liquid crystal display panel of prior art, uses a color filter to display different colors, but the color filter has some defects, such as decreasing brightness when the transparent display device is under a transparent mode. Other devices use a Pen Tile RGBW technology to display four different colors, and white is aligned with the RGB in a 2×2 matrix to enhance the brightness of the device. However, the 4 sub-pixels with different colors in the Pen Tile RGBW technology are aligned in a matrix, which may easily cause granular screen problems. Given the above, a liquid crystal display device structure is still needed to overcome these problems.

SUMMARY OF THE INVENTION

The main purpose of the present invention is to provide a pixel structure, a liquid crystal display panel and a transparent liquid crystal display device, dispose a white sub-pixel beside each of the sub-pixels, in order to enhance the brightness of the device and avoid granular screen defects.

According to a preferred embodiment of the present invention, a pixel structure of a liquid crystal display panel includes a plurality of display pixel units and a plurality of control devices. Each of the display pixel units includes a first pixel unit, a second pixel unit and a third pixel unit. The second pixel unit is disposed adjacent to the first pixel unit, and the third pixel unit is disposed adjacent to the first pixel unit. The first pixel unit includes a first sub-pixel adapted to provide a first color and a first white sub-pixel, the second pixel unit includes a second sub-pixel adapted to provide a second color and a second white sub-pixel, and the third pixel unit includes a third sub-pixel adapted to provide a third color and a third white sub-pixel. The control devices are employed for respectively controlling each of the first sub-pixels, each of the second sub-pixels, each of the third sub-pixels, each of the first white sub-pixels, each of the second white sub-pixels, and each of the third white sub-pixels. The liquid crystal display panel is normally white when the first sub-pixel, the second sub-pixel, the third sub-pixel, the first white sub-pixel, the second white sub-pixel, and the third white sub-pixel are not driven by the control devices.

According to another preferred embodiment of the present invention, a liquid crystal display panel includes a first substrate, a second substrate disposed opposite to the first substrate, a liquid crystal layer disposed between the first substrate and the second substrate, and a pixel structure disposed between the first substrate and the second substrate. The pixel structure includes a plurality of display pixel units and a plurality of control devices. Each of the display pixel units includes a first pixel unit, a second pixel unit and a third pixel unit. The second pixel unit is disposed adjacent to the first pixel unit, and the third pixel unit is disposed adjacent to the first pixel unit. The first pixel unit includes a first sub-pixel adapted to provide a first color and a first white sub-pixel, the second pixel unit includes a second sub-pixel adapted to provide a second color and a second white sub-pixel, and the third pixel unit includes a third sub-pixel adapted to provide a third color and a third white sub-pixel. The control devices are employed for respectively controlling each of the first sub-pixels, each of the second sub-pixels, each of the third sub-pixels, each of the first white sub-pixels, each of the second white sub-pixels, and each of the third white sub-pixels. The liquid crystal display panel is normally white when the first sub-pixel, the second sub-pixel, the third sub-pixel, the first white sub-pixel, the second white sub-pixel, and the third white sub-pixel are not driven by the control devices.

According to another preferred embodiment of the present invention, a transparent liquid crystal display device includes the liquid crystal display panel and a backlight module disposed under the liquid crystal display panel. The liquid crystal display panel includes a first substrate, a second substrate disposed opposite to the first substrate, a liquid crystal layer disposed between the first substrate and the second substrate, and a pixel structure disposed between the first substrate and the second substrate. The pixel structure includes a plurality of display pixel units and a plurality of control devices. Each of the display pixel units includes a first pixel unit, a second pixel unit and a third pixel unit. The second pixel unit is disposed adjacent to the first pixel unit, and the third pixel unit is disposed adjacent to the first pixel unit. The first pixel unit includes a first sub-pixel adapted to provide a first color and a first white sub-pixel, the second pixel unit includes a second sub-pixel adapted to provide a second color and a second white sub-pixel, and the third pixel unit includes a third sub-pixel adapted to provide a third color and a third white sub-pixel. The control devices are employed for respectively controlling each of the first sub-pixels, each of the second sub-pixels, each of the third sub-pixels, each of the first white sub-pixels, each of the second white sub-pixels, and each of the third white sub-pixels. The liquid crystal display panel is normally white when the backlight module provides a light to the liquid crystal display panel and when the first sub-pixel, the second sub-pixel, the third sub-pixel, the first white sub-pixel, the second white sub-pixel, and the third white sub-pixel are not driven by the control devices.

In the present invention, the white sub-pixels are respectively disposed adjacent to each of the sub-pixel which are employed adapted to provide different colors. The display brightness may accordingly be enhanced. Relative positions between each of the sub-pixels may not be affected, and related display defects may be accordingly avoided. The display performance and display quality of the liquid crystal display panel and the transparent liquid crystal display device with the pixel structures may also be enhanced.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention to users skilled in the technology of the present invention, preferred embodiments are detailed as follows. The preferred embodiments of the present invention are illustrated in the accompanying drawings with numbered elements to clarify the contents and effects to be achieved.

Figure 1:
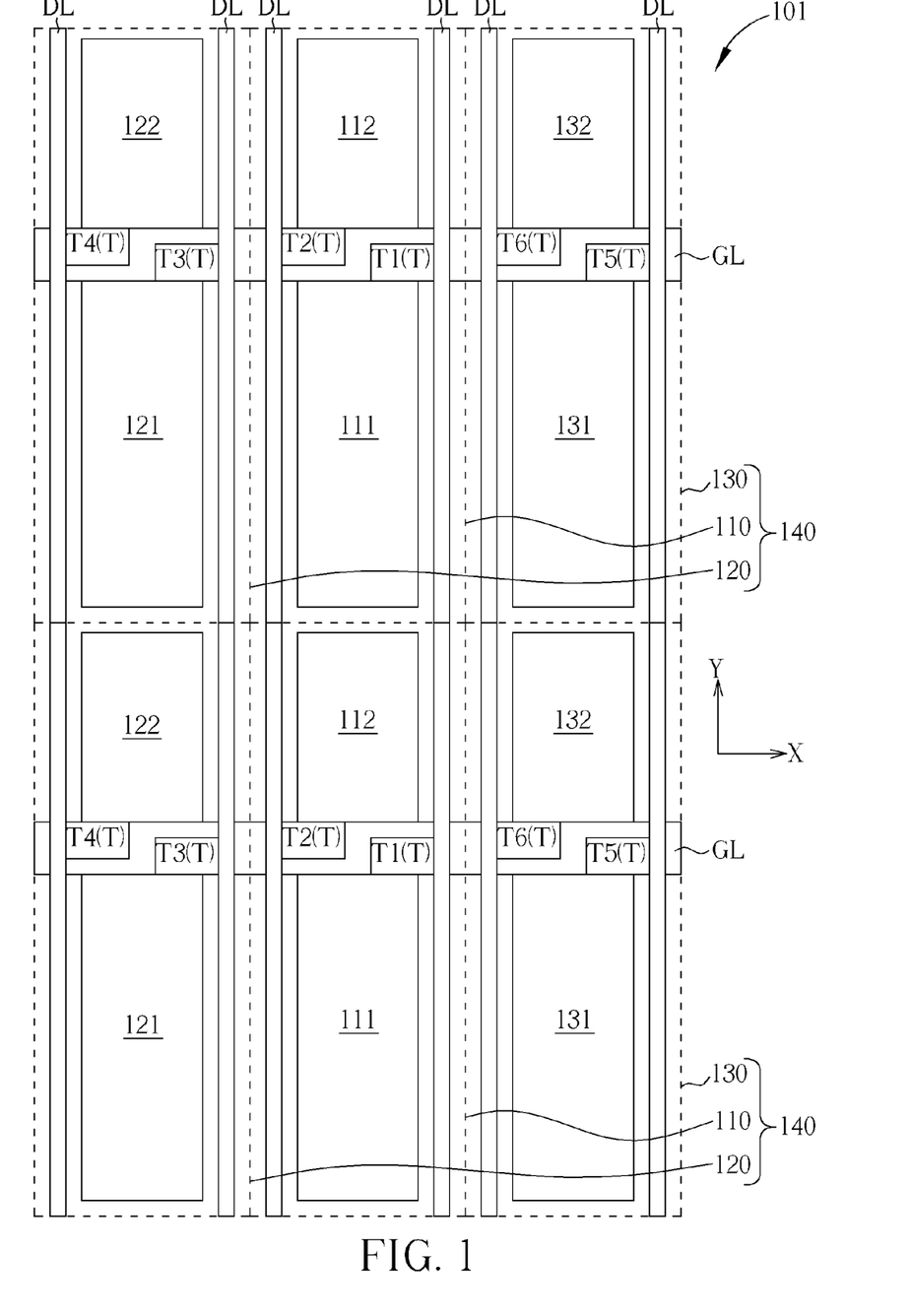
FIG. 1 is a top view schematic diagram illustrating a pixel structure according to a first preferred embodiment of the present invention.
Figure 2:
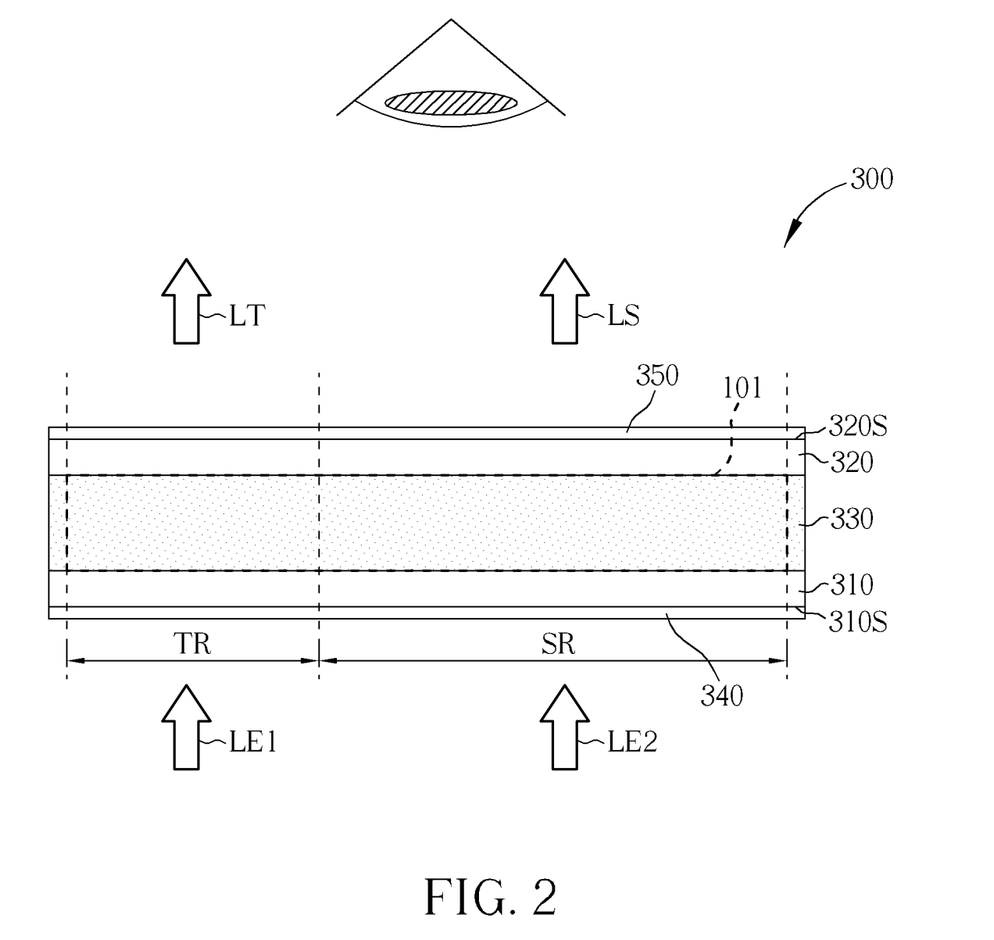
FIG. 2 is a schematic diagram illustrating a liquid crystal display panel according to a first preferred embodiment of the present invention.

Please refer to FIG. 1 and FIG. 2. FIG. 1 is a top view schematic diagram illustrating a pixel structure according to a first preferred embodiment of the present invention. FIG. 2 is a schematic diagram illustrating a liquid crystal display panel according to a first preferred embodiment of the present invention. As shown in FIG. 1 and FIG. 2, a pixel structure 101 of a liquid crystal display panel 300 is provided. The pixel structure 101 includes a plurality of display pixel units 140 and a plurality of control devices T. Each display pixel unit 140 includes a first pixel unit 110, a second pixel unit 120 and a third pixel unit 130. The second pixel unit 120 is disposed adjacent to the first pixel unit 110, and the third pixel unit 130 is disposed adjacent to the first pixel unit 110. The first pixel unit 110 includes a first sub-pixel unit 111 adapted to provide a first color and a first white sub-pixel 112. The second pixel unit 120 includes a second sub-pixel unit 121 adapted to provide a second color and a second white sub-pixel 122. The third pixel unit 130 includes a third sub-pixel unit 131 adapted to provide a third color and a third white sub-pixel 132. In this embodiment, the first color, the second color and the third color are preferably different. In other words, the first sub-pixel unit 111 may include a green sub-pixel, the second sub-pixel unit 121 may include a red sub-pixel, the third sub-pixel unit 131 may include a blue sub-pixel, but the present invention is not limited thereto and the colors provided by each of the first sub-pixels, each of the second sub-pixels and each of the third sub-pixels may be further modified for different color mixing effects.

As shown in FIG. 1, the pixel structure 101 further includes a plurality of gate lines GL extending along a first direction X and parallel to each other, and a plurality of data lines DL extending along a second direction Y and paralleled to each other. Each of the first sub-pixels 111 and each of the first white sub-pixels 112 are disposed between two adjacent data lines DL, each of the second sub-pixels 121 and each of the second white sub-pixels 122 are disposed between two adjacent data lines DL, and each of the third sub-pixels 131 and each of the third white sub-pixels 132 are disposed between two adjacent data lines DL. It is worth noting that each of the first sub-pixel 111 is disposed adjacent to the first white sub-pixel 112 in the second direction Y, each of the second sub-pixel 121 is disposed adjacent to the second white sub-pixel 122 in the second direction Y and each of the third sub-pixel 131 is disposed adjacent to the third white sub-pixel 132 in the second direction Y. In other words, the first white sub-pixel 112, the second white sub-pixel 122, and the third white sub-pixel 132 are disposed without interfering with the stripe arrangement of the red sub-pixel, the blue sub-pixel and the green sub-pixel. Therefore, the granular screen problems may be accordingly avoided.

As shown in FIG. 1 and FIG. 2, in this embodiment, each control device T respectively controls each sub-pixel 111, each second sub-pixel 121, each third sub-pixel 131, each first white sub-pixel 112, each second white sub-pixel 122, and each third white sub-pixel 132. In this embodiment, the control devices T may includes a control unit T1 adapted to control the first sub-pixel 111, a control unit T2 adapted to control the first white sub-pixel 112, a control unit T3 adapted to control the second sub-pixel 121, a control unit T4 for control the second white sub-pixel 122, a control unit T5 adapted to control the third sub-pixel 131, and a control unit T6 adapted to control the third white sub-pixel 132. The control device T in this embodiment may include a thin film transistor (TFT), such as amorphous silicon thin film transistor, a poly silicon thin film transistor or an oxide semiconductor thin film transistor, but not limited thereto. Besides, in this embodiment, the liquid crystal display panel 300 is normally white when the first sub-pixel 111, the second sub-pixel 121, the third sub-pixel 131, the first white sub-pixel 112, the second white sub-pixel 122, and the third white sub-pixel 132 are not driven by the control devices T. In other words, the liquid crystal display panel 300 is a normally white liquid crystal display device.

As shown in FIG. 1, in this embodiment, the control units T1~T6 corresponding to the identical display pixel units 140 are electrically connected to the identical gate line GL, and the control units T1~T6 corresponding to the identical display pixel units 140 are electrically connected to different data lines DL. In other words, the pixel structure 101 in this embodiment is a 2D1G structure, but the present invention is not limited thereto and the arrangement of the control units T may be further modified for different purposes. Additionally, areas of each of the first white sub-pixels 112, each of the second white sub-pixels 122 and each of the third white sub-pixels 132 may be equal to each other, and areas of each of the first sub-pixels 111, each of the second sub-pixels 121 and each of the third sub-pixels 131 may be equal to each other for simplifying the arrangement of the gate lines GL and the data lines DL, but the present invention is not limited thereto and the areas of each of the first sub-pixels 111, each of the second sub-pixels 121, each of the third sub-pixels 131, each of the first white sub-pixels 112, each of the second white sub-pixels 122 and each of the third white sub-pixels 132 may be further modified for optimizing the display brightness and the display colors.

Figure 3:
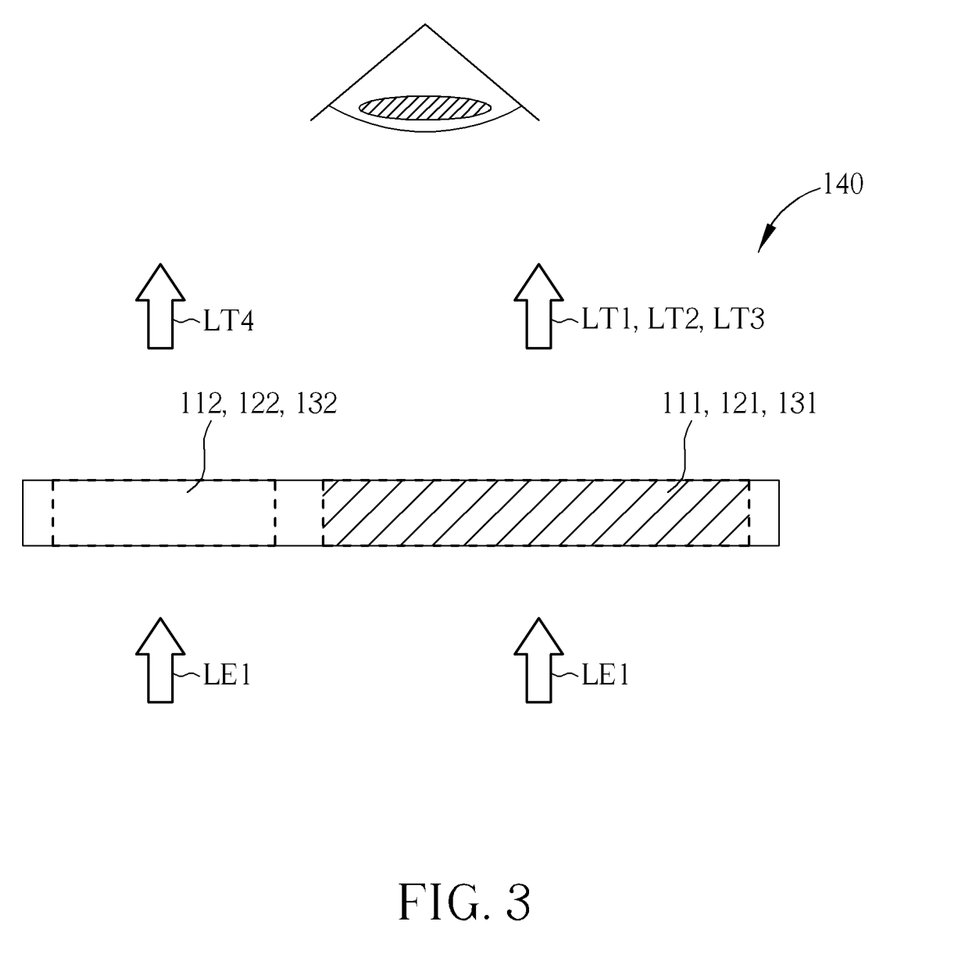
FIGS. 3-4 are schematic diagrams illustrating the display state of a liquid crystal display panel according to a first preferred embodiment of the present invention.
Figure 4:
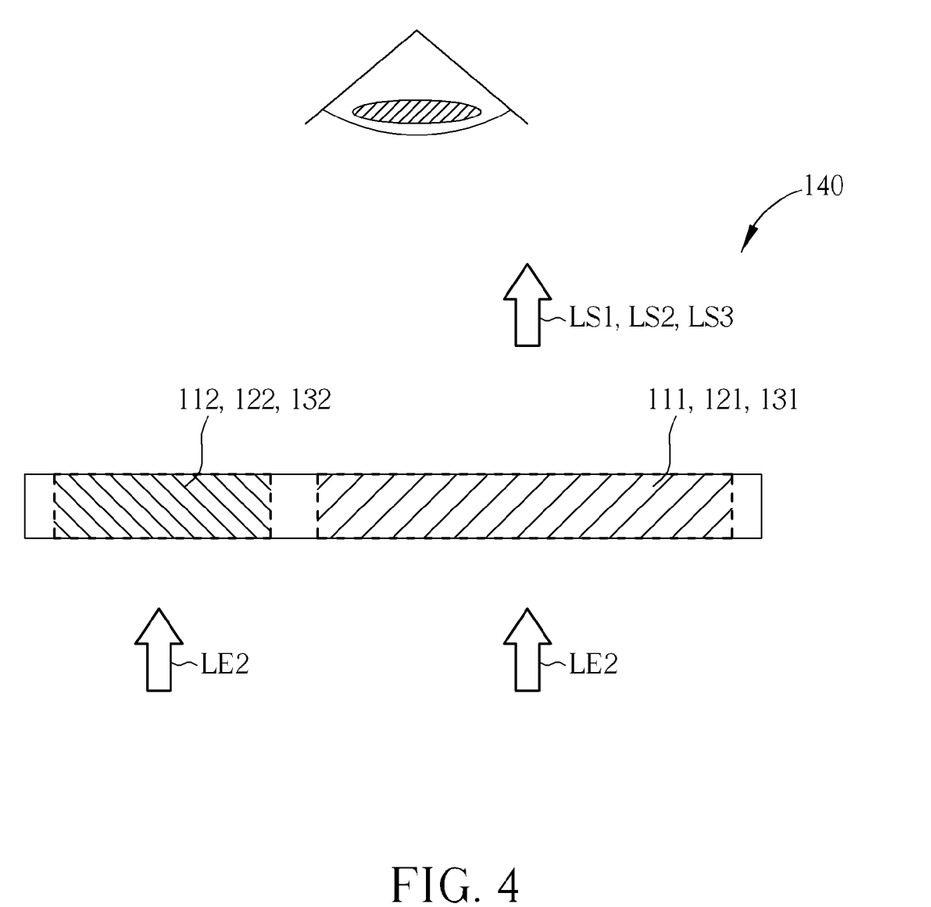

Please refer to FIGS. 1-4. FIG. 2 is a schematic diagram illustrating a liquid crystal display panel according to the first preferred embodiment of the present invention. FIG. 3 and FIG. 4 are schematic diagrams illustrating the display state of the liquid crystal display panel according to the first preferred embodiment of the present invention. FIG. 3 shows the display state under a transparent display mode, and FIG. 4 shows the display state under an image display mode. As shown in FIG. 2, the liquid crystal display panel 300 of the present invention includes a first substrate 310, a second substrate 320, a liquid crystal layer 330, the pixel structure 101, a first polarizer 340 and a second polarizer 350. The second substrate 320 is disposed opposite to the first substrate 310. The liquid crystal layer 330 is disposed between the first substrate 310 and the second substrate 320. The pixel unit structure 101 is disposed between the first substrate 310 and the second substrate 320. The first polarizer 340 is disposed on a outer surface 310S of the first substrate 310, and the second polarizer 350 is disposed on a outer surface 320S of the second substrate 320. The polarizing direction of the first polarizer 340 is preferred to be parallel to the polarizing direction of the second polarizer 350, but not limited thereto. In addition, the liquid crystal layer 330 is preferably a vertical alignment (VA) liquid crystal layer, but not limited thereto. The details of the pixel structure 101 have been described above, and won't be described here again. It is worth noting that the pixel structure 101 has white sub-pixels adapted to display transparent state, so the liquid crystal display panel 300 may includes a transparent liquid crystal display panel. Moreover, the liquid crystal display panel 300 is preferably a normally white liquid crystal display panel, which includes VA liquid crystal layer and polarizers with parallel polarizing directions, and the liquid crystal is aligned as a single domain state under the transparent display mode for better transparent display effect. Hence, the liquid crystal display panel 300 of this embodiment is preferably used in a transparent display device. On the contrary, a normally black liquid crystal display panel with a VA liquid crystal layer aligned as a multi domain state under the transparent display mode may easily encounter dispersion problems.

As shown in FIG. 3, in this embodiment, at least some of the first white sub-pixels 112, some of the second white sub-pixels 122 and some of the third white sub-pixels 132 of the display pixel units 140 are kept in a transparent state under a transparent display mode. More precisely, under the transparent display mode, the first white sub-pixels 112, the second white sub-pixels 122 and the third white sub-pixels 132 are not driven and kept in a bright state, allowing an external light ray LE1 to penetrate the first white sub-pixels 112, the second white sub-pixels 122 and the third white sub-pixels 132 to form a penetrating light ray LT4. Additionally, under the transparent display mode, the first white sub-pixels 112, the second white sub-pixels 122 and the third white sub-pixels 132 are kept in a bright state respectively, allowing the external light ray LE1 to penetrate the first sub-pixels 111, the second sub-pixels 121 and the third sub-pixels 131 and form a penetrating light ray LT1, a penetrating light ray LT2, a penetrating light ray LT3 respectively. Since the first sub-pixels 111, the second sub-pixels 121 and the third sub-pixels 131 are preferred to be mixed and form a white light, so the penetrating light ray LT1, the penetrating light ray LT2 and the penetrating light ray LT3 may combine together to look transparent.

As shown in FIG. 4, under the image display mode, some of the first white sub-pixels 112, some of the second white sub-pixels 122 and some of the third white sub-pixels 132 in each display pixel unit 140 are kept in a light-shielding state. More precisely, under the image display mode, the first white sub-pixel 112, the second white sub-pixel 122 and the third white sub-pixel 132 are driven and kept in a light-shielding state, and an external light LE2 can not penetrate the first white sub-pixel 112, the second white sub-pixel 122, nor the third white sub-pixel 132. Additionally, under the image display mode, the first sub-pixels 111, the second sub-pixels 121 and the third sub-pixels 131 may be kept in different states for different display effect, and external light ray LE1 may penetrate the first sub-pixels 111, the second sub-pixels 121 and the third sub-pixels 131 for forming a display light ray LS1, a display light ray LS2, and a display light ray LS3 respectively. By combining the display light LS1, the display light LS2 and the display light LS3, many kinds of colors can be provided and displayed on the liquid crystal display panel 300. It is worth noting that the first white sub-pixels 112, the second white sub-pixels 122 and the third white sub-pixels 132 may be kept in a light-shielding state under the image display mode, so that the color saturation displayed by the first white sub-pixels 112, the second white sub-pixels 122 and the third white sub-pixels 132 is not affected, in order to enhance the display quality.

As shown in FIGS. 2-4, under a partially transparent mode, the liquid crystal display panel 300 may have a transparent region TR and an image display region SR, the driving method of each sub-pixel in the transparent region TR is similar to that of the display pixel unit 140 under the transparent display mode, and the driving method of each sub-pixel in the image display region SR is similar to that of the display pixel unit 140 under the image display mode. In other words, at least one of each first white sub-pixel 112, each second white sub-pixel 122 and each third white sub-pixel 132 in the transparent region is kept in a transparent state, and each of the first white sub-pixels 112, each of the second white sub-pixels 122 and each of the third white sub-pixels 132 in the image display region are kept in a light-shielding state, allowing this way the liquid crystal display panel 300 to enhance the color saturation and the brightness under the partially transparent mode.

Figure 5:
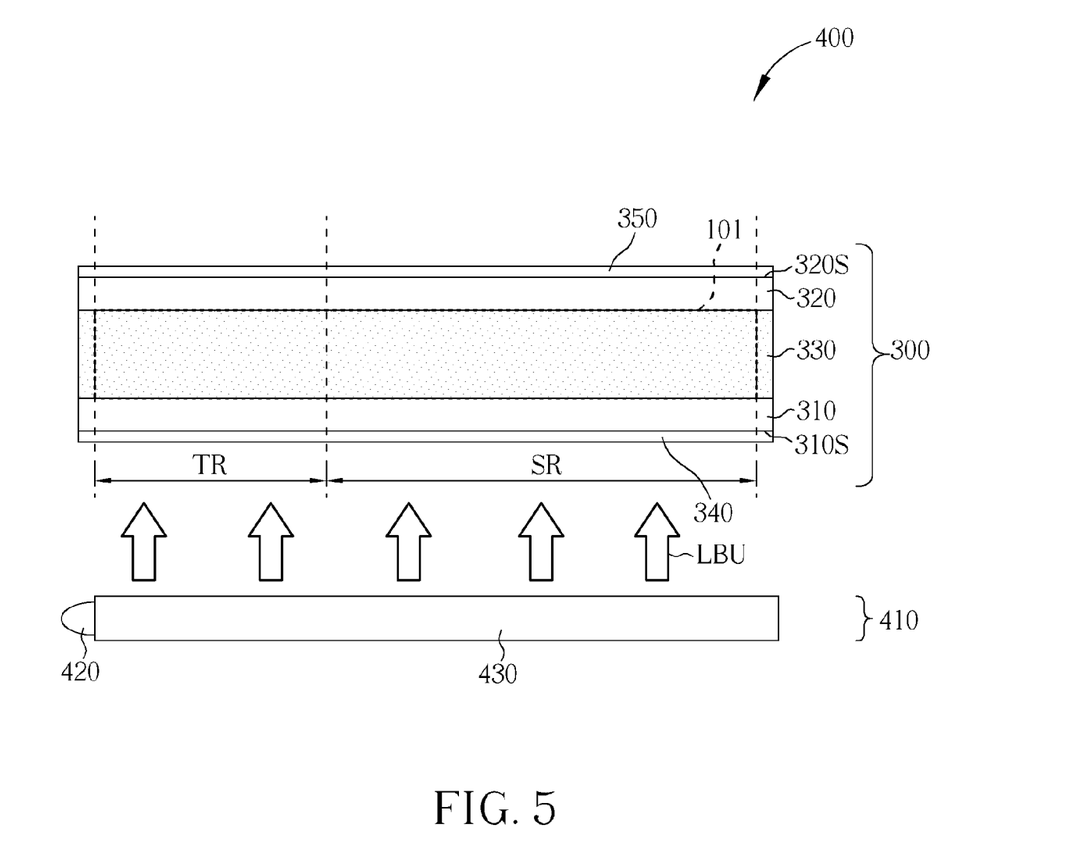
FIG. 5 is a schematic diagram illustrating a transparent liquid crystal display device according to a first preferred embodiment of the present invention.

Please refer to FIG. 5 and FIG. 1. FIG. 5 is a schematic diagram illustrating a transparent liquid crystal display device according to the first preferred embodiment of the present invention. As shown in FIG. 5 and FIG. 1, the transparent liquid crystal display device 400 includes a liquid crystal display panel 300 and a backlight module 410, the liquid crystal display panel 300 has been introduced previously and will not be described here again, the back module 410 is disposed under the liquid crystal display panel 300, the liquid crystal display panel 300 is normally white when the backlight module 410 provides a light LBU to the liquid crystal display panel 300 and the first sub-pixel 111, the second sub-pixel 121, the third sub-pixel 131, the first white sub-pixel 112, the second white sub-pixel 122, and the third white sub-pixel 132 are not driven by the control devices T. Additionally, the backlight module 410 includes a light source 420 and a light guide plate 430. It is worth noting that the backlight module 410 may include an edge-type backlight module, but not limited thereto. In other words, the light source 420 is preferred to be disposed on the side of the light guide plate 430, by using the light guide plate 430 to emit the light LBU to the liquid crystal display panel 300. The backlight module 410 may be employed for improving the brightness of the liquid crystal display panel 300 which uses only external light for displaying images.

The following description will detail the different embodiments of the pixel structure of the present invention. To simplify the description, the following description will detail the dissimilarities among different embodiments and the identical features will not be redundantly described. For making it easier to compare the differences between the embodiments, identical components in each of the following embodiments are marked with identical symbols.

Figure 6:
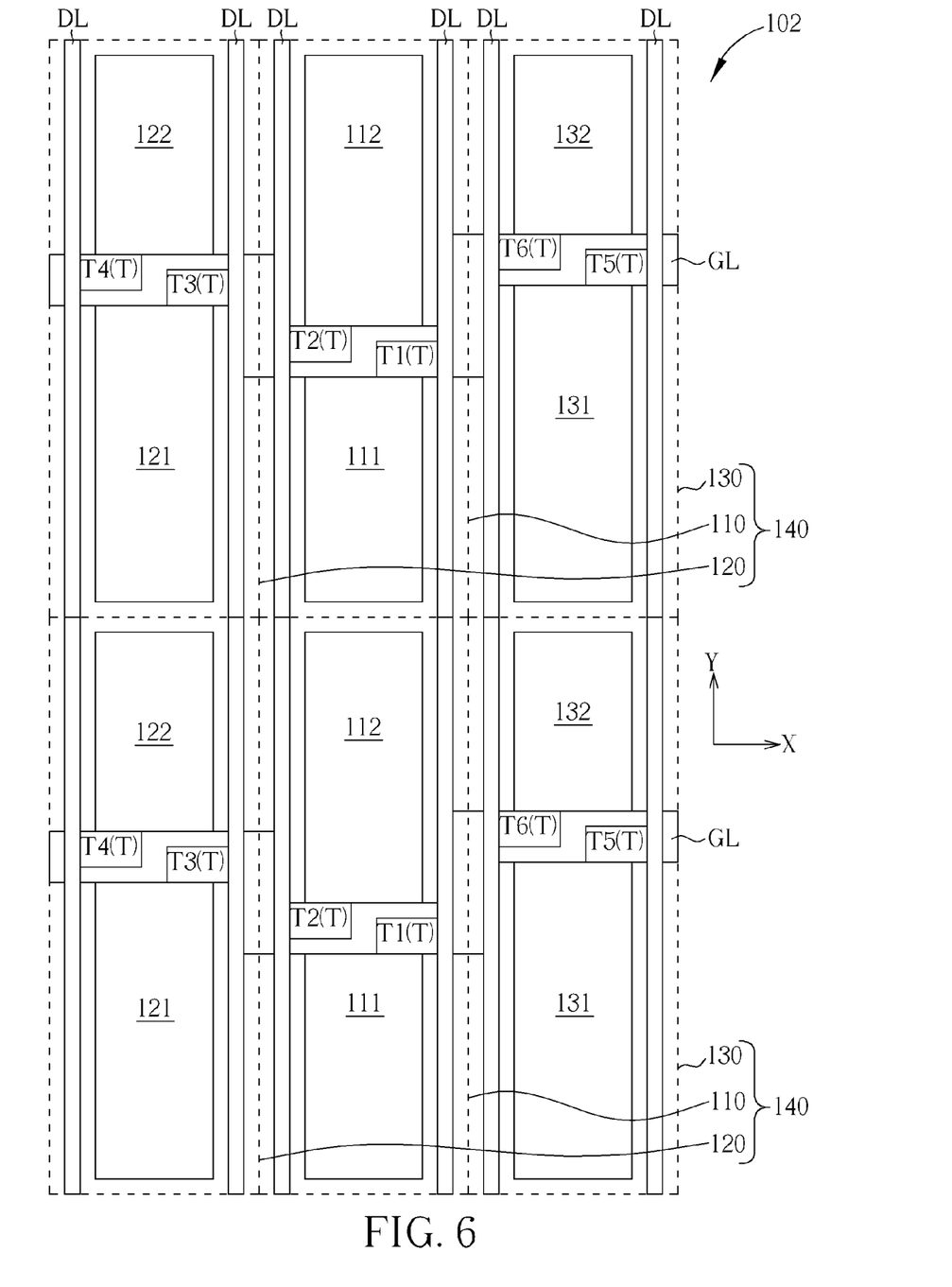
FIG. 6 is top view schematic diagram illustrating a pixel structure according to a second preferred embodiment of the present invention.

Please refer to FIG. 6. FIG. 6 is a top view schematic diagram illustrating a pixel structure according to the second preferred embodiment of the present invention. As shown in FIG. 6, the difference between the pixel structure 102 of the second preferred embodiment and the pixel structure 101 of the first preferred embodiment is that the areas of the first white sub-pixel 112, the second white sub-pixel 122, and the third white sub-pixel 132 are different from each other, and the areas of the first sub-pixel 111, the second sub-pixel 121, and the third sub-pixel 131 are different from each other. The needed colors can be obtained by adjusting the area of each sub-pixel. More particularly, in this embodiment, the first sub-pixel unit 111 may be a green sub-pixel unit, the second sub-pixel unit 121 may be a red sub-pixel unit, and the third sub-pixel unit 131 may be a blue sub-pixel unit. In order to improve the color gamut wide, the area of each sub-pixel unit may be adjusted. For example, the area of the first sub-pixel unit 111 may be smaller than the area of the second sub-pixel unit 121, and the area of the second sub-pixel unit 121 may be smaller than the area of the third sub-pixel unit 131. Except for the areas of the sub-pixels, the other elements of the embodiment are similar to the elements in the first preferred embodiment and are not described again here.

Figure 7:
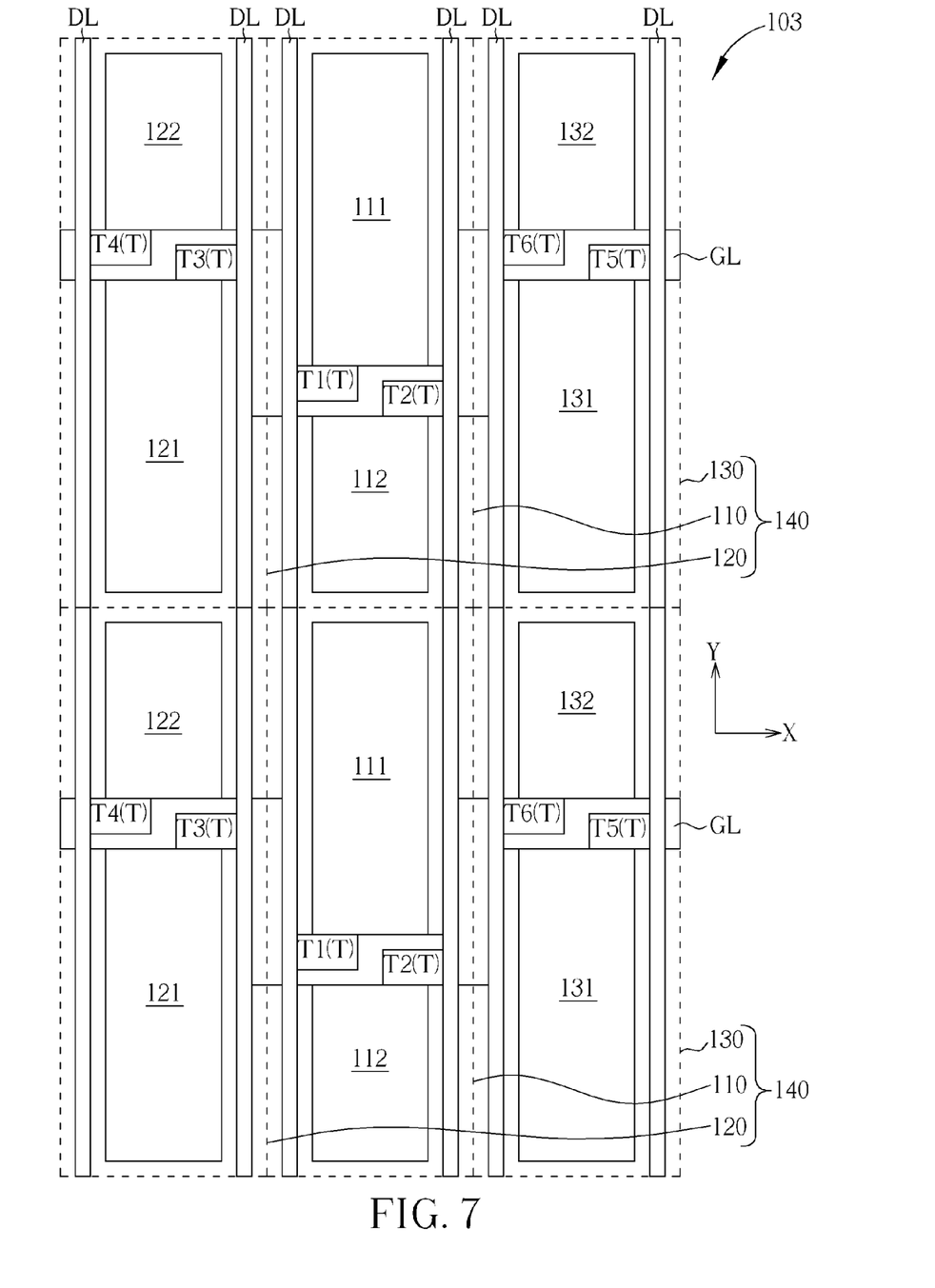
FIG. 7 is top view schematic diagram illustrating a pixel structure according to a third preferred embodiment of the present invention.

Please refer to FIG. 7. FIG. 7 is a top view schematic diagram illustrating a pixel structure according to a third preferred embodiment of the present invention. As shown in FIG. 7, the difference between the pixel structure 103 of the third preferred embodiment and the pixel structure 101 of the first preferred embodiment is that the first white sub-pixel 112, the second white sub-pixel 122, and the third white sub-pixel 132 are aligned in a zigzag arrangement, and the first sub-pixel 111, the second sub-pixel 121, the third sub-pixel 131 are aligned in a zigzag arrangement too. Under this zigzag arrangement, the display effect may be obtained without interfering with the stripe arrangement of the pixel units. Additionally, in this embodiment, the areas of each first sub-pixels 111, each second sub-pixels 121 and each third sub-pixel 131 can be equal to each other or not, and the areas of each first white sub-pixel 112, each second white sub-pixel 122, and each third white sub-pixel 132 can be equal to each other or not.

Figure 8:
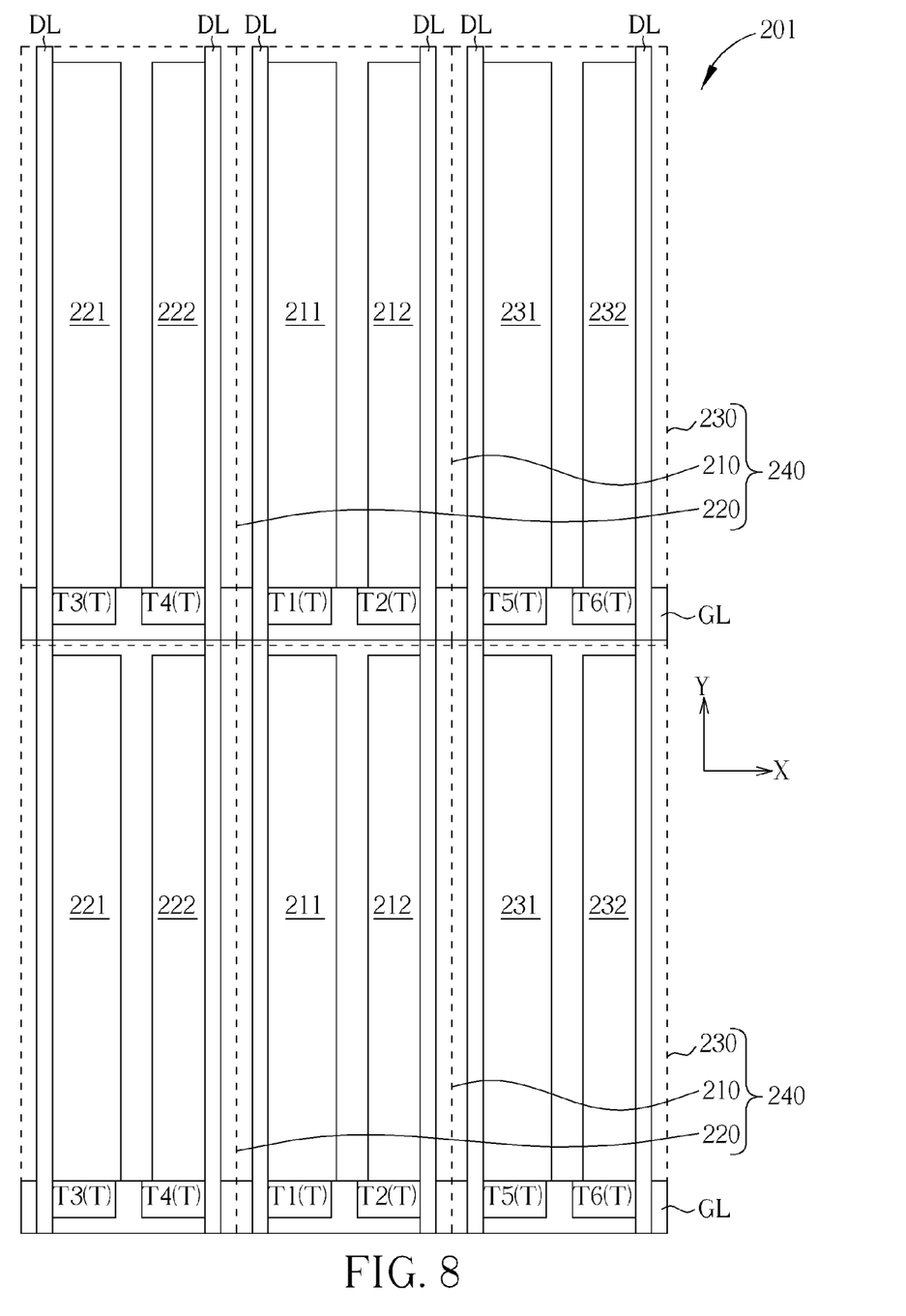
FIG. 8 is a top view schematic diagram illustrating a pixel structure according to a fourth preferred embodiment of the present invention.

Please refer to FIG. 8. FIG. 8 is a top view schematic diagram illustrating a pixel structure according to a fourth preferred embodiment of the present invention. As shown in FIG. 8, the pixel structure includes a plurality of display pixel units 240 and a plurality of control devices T. Each of the display pixel unit 240 includes a first pixel unit 210, a second pixel unit 220 and a third pixel unit 230. The second pixel unit 220 is disposed adjacent to the first pixel unit 210. The third pixel unit 230 is disposed adjacent to the first pixel unit 210. The first pixel unit 210 includes a first sub-pixel unit 211 adapted to provide a first color and a first white sub-pixel 212. The second pixel unit 220 includes a second sub-pixel unit 221 adapted to provide a second color and a second white sub-pixel 222. The third pixel unit 230 includes a third sub-pixel unit 231 adapted to provide a third color and a third white sub-pixel 232. The difference between the pixel structure 201 and the pixel structure 101 of first preferred embodiment is that each of the first sub-pixels 211 is disposed adjacent to each of the first white sub-pixels 212 along a first direction X, each of the second sub-pixels 221 is disposed adjacent to each of the second white sub-pixels 222 along the first direction X, and each of the third sub-pixels 231 is disposed adjacent to each of the third white sub-pixel 232 along the first direction X. In other words, each of the first sub-pixels 211, each of the second sub-pixels 221, each of the third sub-pixels 231, each of the first white sub-pixels 212, each of the second white sub-pixels 222, and each of the third white sub-pixels 232 may be alternatively disposed along the first direction X. Therefore, the first white sub-pixel 212, the second white sub-pixel 222, and the third white sub-pixel 232 are disposed without interfering with the stripe arrangement of the sub-pixels which are employed adapted to provide different colors. The granular screen problems may be accordingly avoided. Additionally, each display pixel unit 240 is preferably disposed between two adjacent gate lines GL; the control units T1~T6 corresponding to a display pixel units 240 may be electrically connected to the same gate line GL, and the control units T1~T6 corresponding to the same display pixel units 240 may be electrically connected to different data lines DL, but not limited thereto. Except for the arrangement of the sub-pixels, other elements of this embodiment are similar to those of the first preferred embodiment and are described again here.

Figure 9:
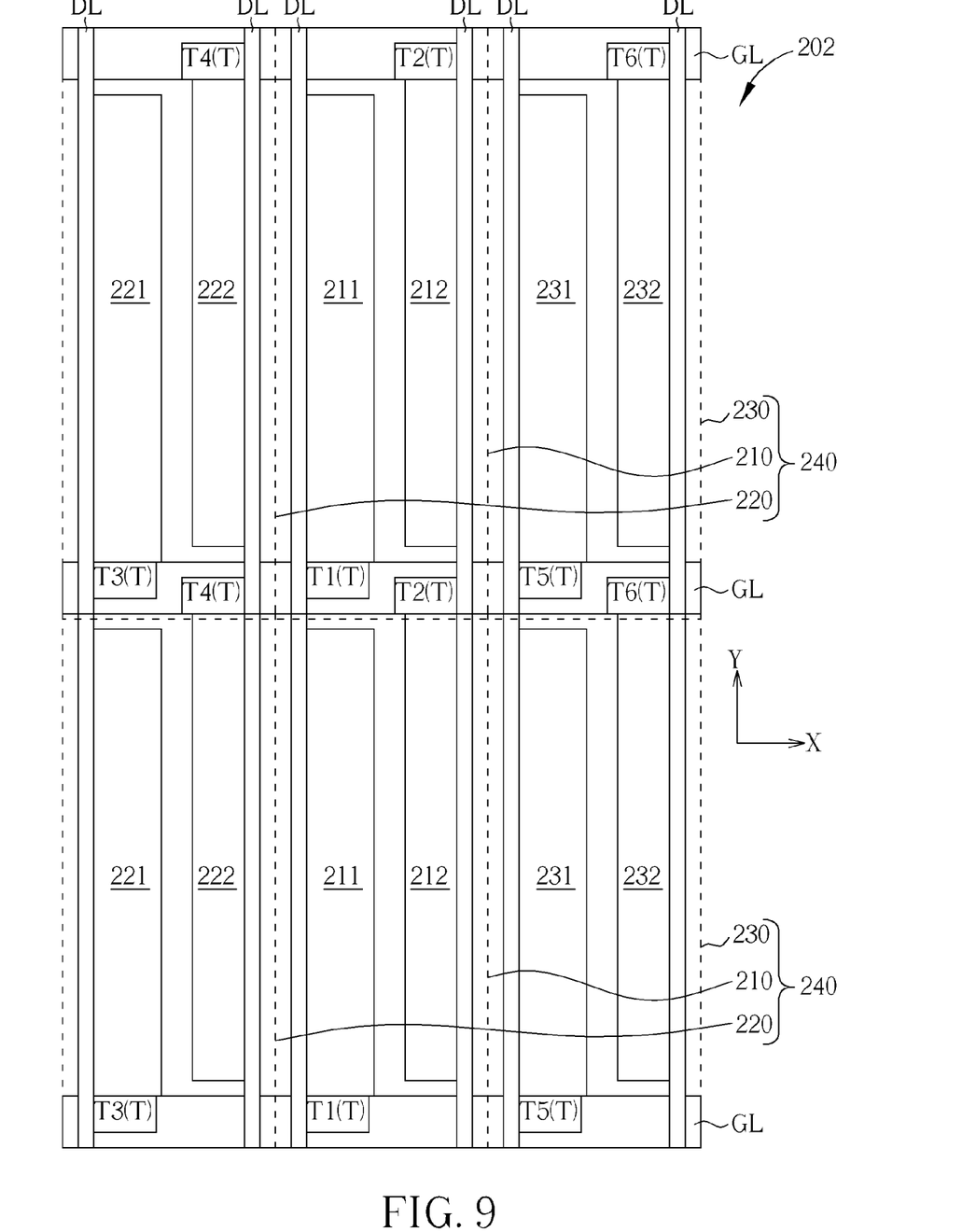
FIG. 9 is a top view schematic diagram illustrating a pixel structure according to a fifth preferred embodiment of the present invention.

Please refer to FIG. 9. FIG. 9 is a top view schematic diagram illustrating a pixel structure according to a fifth preferred embodiment of the present invention. As shown in FIG. 9, the difference between the pixel structure 202 and the pixel structure 201 of the fourth preferred embodiment is that at least a control unit T and another control unit T corresponding to a display pixel unit 240 may be electrically connected to different gate lines GL. The control units T corresponding to the same display pixel unit 240 may be electrically connected to different data lines DL. More particularly, the control units T1, T3 and T5 respectively controlling the first sub-pixel 211, the second sub-pixel 221 and the third sub-pixel 231 are electrically connected to the identical gate line GL, and the control units T2, T4 and T4 respectively controlling the first white sub-pixel 212, the second white sub-pixel 222 and the third white sub-pixel 232 are electrically connected to another gate line GL, but the present invention is not limited thereto and the arrangement of the control units may be further modified for other driving considerations.

Figure 10:
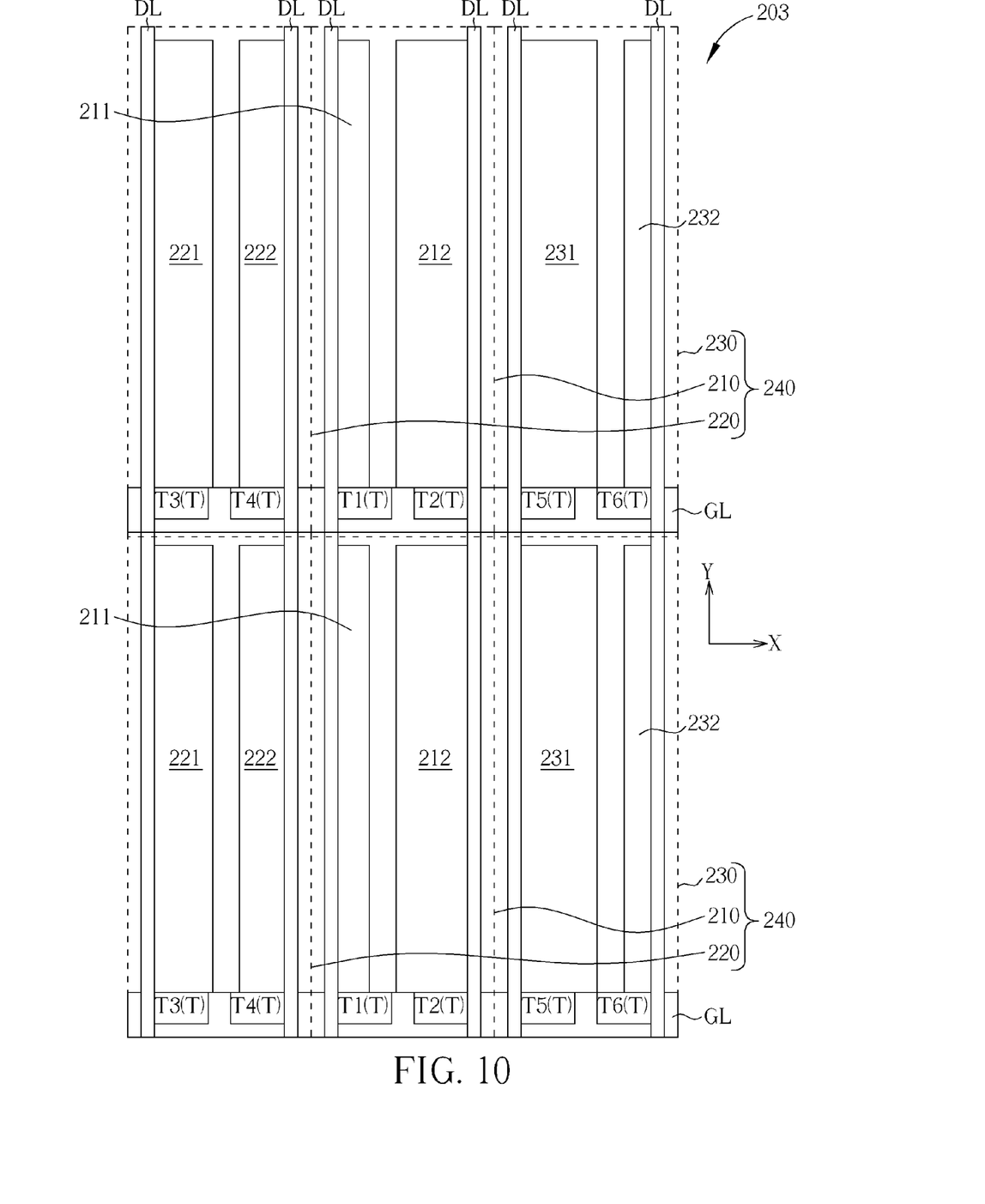
FIG. 10 is a top view schematic diagram illustrating a pixel structure according to a sixth preferred embodiment of the present invention.

Please refer to FIG. 10. FIG. 10 is a top view schematic diagram illustrating a pixel structure according to a sixth preferred embodiment of the present invention. As shown in FIG. 10, the difference between the pixel structure 203 and the pixel structure 201 of the fourth preferred embodiment is that the areas of the first white sub-pixel 212, the second white sub-pixel 222 and the third white sub-pixel 232 are different from each other, and the areas of the first sub-pixel 211, the second sub-pixel 221 and the third sub-pixel 231 are different from each other. Specific display parameters can be reached by adjusting the area of each sub-pixels and each white sub-pixel. Except for the areas of the sub-pixels, others elements of the embodiment are similar to those elements of the fourth preferred embodiment and are not described again here.

To summarize the above descriptions, the display brightness is enhanced by disposing white sub-pixels adjacent to each of the sub-pixels which are employed adapted to provide different colors. The granular screen problems may be avoided because the stripe arrangement of the color sub-pixels may not be interfered by the white sub-pixels. The pixel structure of the present invention may be employed in the liquid crystal display panel and the transparent liquid crystal display device for improving the display effect and the display quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel structure, used in a liquid crystal display panel, the pixel structure comprising:
a plurality of display pixel units, each display pixel unit comprising:
a first pixel unit, the first pixel unit comprising:
a first sub-pixel adapted to provide a first color; and
a first white sub-pixel;
a second pixel unit, disposed adjacent to the first pixel unit, the second pixel unit comprising:
a second sub-pixel adapted to provide a second color; and
a second white sub-pixel; and
a third pixel unit, disposed adjacent to the second pixel unit, the third pixel unit comprising:
a third sub-pixel adapted to provide a third color; and
a third white sub-pixel; and
a plurality of control devices, respectively controlling each of the first sub-pixels, each of the second sub-pixels, each of the third sub-pixels, each of the first white sub-pixels, each of the second white sub-pixels, and each of the third white sub-pixels, wherein the liquid crystal display panel is normally white when the first sub-pixel, the second sub-pixel, the third sub-pixel, the first white sub-pixel, the second white sub-pixel, and the third white sub-pixel are not driven by the control devices.

2. The pixel structure of claim 1, further comprising:
a plurality of gate lines, extending along a first direction and being parallel to each other; and
a plurality of data lines, extending along a second direction and being parallel to each other;
wherein each of the first sub-pixels and each of the first white sub-pixels are disposed between two adjacent data lines, each of the second sub-pixels and each of the second white sub-pixels are disposed between two adjacent data lines, and each of the third sub-pixels and each of the third white sub-pixels are disposed between two adjacent data lines.

3. The pixel structure of claim 2, wherein each of the first sub-pixels is disposed adjacent to the first white sub-pixel in the second direction, wherein each of the second sub-pixels is disposed adjacent to the second white sub-pixel in the second direction, and wherein each of the third sub-pixels is disposed adjacent to the third white sub-pixels in the second direction.

4. The pixel structure of claim 2, wherein each of the first sub-pixels is disposed adjacent to the first white sub-pixel in the first direction, wherein each of the second sub-pixels is disposed adjacent to the second white sub-pixel in the first direction, and wherein each of the third sub-pixels is disposed adjacent to the third white sub-pixels in the first direction.

5. The pixel structure of claim 2, wherein the control devices corresponding to each display pixel unit are electrically connected to the same gate lines and wherein the control devices corresponding to each display pixel unit are electrically connected to different data lines.

6. The pixel structure of claim 2, wherein at least one of the control devices and another control device corresponding to a display pixel unit are electrically connected to different gate lines, and wherein at least one of the control devices and another control device corresponding to the same display pixel unit are electrically connected to different data lines.

7. The pixel structure of claim 1, wherein an area of each first white sub-pixel, an area of each second white sub-pixel, and an area of each third white sub-pixel are equal to each other.

8. The pixel structure of claim 1, wherein an area of each first white sub-pixel, an area of each second white sub-pixel, and an area of each third white sub-pixel are different from each other, and wherein an area of each first sub-pixel, an area of each second sub-pixel, and an area of each third sub-pixel are different from each other.

9. The pixel structure of claim 1, wherein each of the first sub-pixels, each of the second sub-pixels and each of the third sub-pixels respectively comprise a green sub-pixel, a red sub-pixel or a blue sub-pixel.

10. A liquid crystal display panel, comprising:
a first substrate;
a second substrate, disposed correspondingly to the first substrate;
a liquid crystal layer, disposed between the first substrate and the second substrate, and the pixel structure of claim 1, disposed between the first substrate and the second substrate.

11. The liquid crystal display panel of claim 10, wherein the liquid crystal display structure includes a transparent liquid crystal display panel.

12. The liquid crystal display panel of claim 10, further comprising:
a first polarizer disposed on an outer surface of the first substrate, and
a second polarizer disposed on an outer surface of the second substrate, wherein a polarizing direction of the first polarizer is parallel to that of the second polarizer.

13. The liquid crystal display panel of claim 10, wherein at least some of the first white sub-pixels, some of the second white sub-pixels and some of the third white sub-pixels in the display pixel units are kept in a transparent state under a transparent display mode.

14. The liquid crystal display panel of claim 10, wherein some of the first white sub-pixels, some of the second white sub-pixels and some of the third white sub-pixels are kept in a light-shielding state under an image display mode.

15. The liquid crystal display panel of claim 10, wherein when the liquid crystal display panel has a transparent region and a image display region under a partially transparent mode, at least one of each first white sub-pixel, each second white sub-pixel and each third white sub-pixel in the transparent region is kept in a transparent state, and each of the first white sub-pixels, each of the second white sub-pixels and each of the third white sub-pixels in the image display region are kept in a light-shielding state.

16. The liquid crystal display panel of claim 10, wherein the liquid crystal layer is a vertical alignment (VA) liquid crystal layer.

17. A transparent liquid crystal display device, comprising:
the liquid crystal display panel of claim 10; and
a backlight module, disposed under the liquid crystal display panel, wherein the liquid crystal display panel is normally white when the backlight module provides a light to the liquid crystal display panel, and when the first sub-pixel, the second sub-pixel, the third sub-pixel, the first white sub-pixel, the second white sub-pixel, and the third white sub-pixel are not driven by the control devices.

* * * * *